(12) United States Patent
Pinto Oliveira Araujo

(10) Patent No.: US 12,466,513 B2
(45) Date of Patent: Nov. 11, 2025

(54) FINGER OR HAND LEVER FOR A MANUAL BRAKE OR CLUTCH LEVER OF A VEHICLE

(71) Applicant: POLISPORT PLÁSTICOS, SA, Carregosoa (PT)

(72) Inventor: Pedro Jorge Pinto Oliveira Araujo, Vale de Cambra (PT)

(73) Assignee: POLISPORT PLÁSTICOS, S.A., Carregosoa (PT)

( * ) Notice: Subject to any disclaimer, the term of this patent is extended or adjusted under 35 U.S.C. 154(b) by 12 days.

(21) Appl. No.: 18/696,413

(22) PCT Filed: Sep. 14, 2022

(86) PCT No.: PCT/IB2022/058646
§ 371 (c)(1),
(2) Date: Mar. 28, 2024

(87) PCT Pub. No.: WO2023/052880
PCT Pub. Date: Apr. 6, 2023

(65) Prior Publication Data
US 2024/0375744 A1   Nov. 14, 2024

(30) Foreign Application Priority Data

Sep. 30, 2021   (PT) .......................... 117492

(51) Int. Cl.
*B62K 23/06*   (2006.01)
*B29C 45/14*   (2006.01)
*B29L 31/46*   (2006.01)

(52) U.S. Cl.
CPC ........ *B62K 23/06* (2013.01); *B29C 45/14819* (2013.01); *B29L 2031/463* (2013.01)

(58) Field of Classification Search
None
See application file for complete search history.

(56) References Cited

U.S. PATENT DOCUMENTS 10,994,799 B1 * 5/2021 Zaehnle .................... G05G 1/04
2004/0173045 A1 * 9/2004 Hancock ................ B62K 23/06
74/544

FOREIGN PATENT DOCUMENTS

GB   2255619 A * 11/1992 ............. B62K 23/06

* cited by examiner

*Primary Examiner* — Vicky A Johnson
(74) *Attorney, Agent, or Firm* — Rivka Friedman

(57) ABSTRACT

The present disclosure is enclosed in the area of levers for vehicles such as bicycles, tricycles, motorcycles, snowmobiles or snow motorcycles. More particularly, the present disclosure relates to a highly resistant finger or hand lever (10) suitable for use on a manual brake or clutch control lever assembly of such vehicles. In an embodiment, the finger or hand lever (10) comprises a metallic core (11) and a polymeric cover (12), the metallic core (11) extending along the lever (10) and the polymeric cover (12) at least partially covering the metallic core (11), the lever (10) comprising a working portion (21) suitable for a user to provide more than one finger and a coupling portion (22) suitable for coupling to a corresponding section of a manual brake or clutch control lever assembly of the vehicle.

16 Claims, 2 Drawing Sheets

FINGER OR HAND LEVER FOR A MANUAL BRAKE OR CLUTCH LEVER OF A VEHICLE

TECHNICAL FIELD

The present disclosure is enclosed in the area of levers for vehicles such as bicycles, tricycles, motorcycles, snowmobiles or snow motorcycles. More particularly, the present disclosure relates to a lever suitable for use on a manual brake or clutch lever of such vehicles, which is highly resistant to impact.

PRIOR ART

Impact is a relevant condition of vehicles such as bicycles, tricycles, motorcycles, snowmobiles or snow motorcycles. Due to their nature, these vehicles are prone to impact, and the search for solutions which mitigate the damage caused by impact has always been present in the respective technical areas.

Finger and hand levers for use on a manual brakes or clutch levers, as well as manual brakes or clutch levers themselves, are particularly small/thin elements in a vehicle, and thereby particularly susceptible to be irreversibly damaged upon the impact of the respective vehicle.

Several solutions have been developed in order to overcome several issues related to the damage of levers.

Typically, so-called unbreakable levers consist of either wholly metallic or wholly polymeric elements.

A wholly metallic lever consists of a significantly heavy solution (typically steel based), which requires the usage of a single piece of metal, or a lighter solution, such as aluminium, but with a lower impact performance, leading to a breakable lever.

A wholly polymeric lever allows to adapt colour or texture, but is quite more prone to breaking and is entirely bendable. Besides, also for such reasons, it does not provide the rider a robust feel, due to the referred bending and low weight.

Another sort of solution, which seeks to tackle the breakage issue through another angle, is the provision of a part of significantly lesser thickness, also called fuse, and which—upon impact—is more prone to breaking and thereby allows the manufacturer to guarantee a control of the breaking section. That allows that—even upon losing a certain part of the lever—the rider will still have a workable section to break or change gears.

Yet another sort of solution, which seeks to tackle the breakage issue through yet another angle, consists of collapsible levers, which comprise biasing assemblies which allow to follow the impact of a lever beyond the typical point, thereby reducing the chance of breakage of the lever in case of impact. U.S. Pat. No. 6,578,445 is an example of such solutions.

Thus, based on prior art solutions, either the breakage issue of levers is addressed through the provision of a solid piece, which has issues whichever the type of material is—as above discussed—or through indirect measures, which still do not provide for a true and unbreakable solution considering the conditions present in on-road and even off-road riding.

The present solution innovatively overcomes such issues.

SUMMARY OF THE DISCLOSURE

It is an object of the present disclosure a finger or hand lever for a manual brake or clutch lever of a vehicle, the vehicle being a bicycle, a tricycle, a motorcycle, a snowmobile or a snow motorcycle. A finger lever may also be called a finger grip.

In an embodiment, the finger or hand lever comprises a metallic core and a polymeric cover, the metallic core extending along the lever and the polymeric cover at least partially covering the metallic core, the lever comprising a working or finger portion suitable for a user to provide more than one finger and a coupling portion suitable for coupling to a corresponding section of a manual brake or clutch control lever assembly of the vehicle.

The lever of the present disclosure thereby allows to have a high resistance to breaking, due to the presence of the metallic core—also called metallic soul—while reducing the usage of metal (as in the solid piece prior art solutions) and also while enabling a high degree of customization of colour, feel, glow or texture of the lever, through the corresponding adaptation of the polymeric cover. The combined operation of metallic core and polymeric cover allow to obtain a highly robust material, which is also highly customizable.

It is also an object of the present disclosure a manual brake or clutch control lever assembly of a vehicle, the vehicle being a bicycle, a tricycle, a motorcycle, a snowmobile or a snow motorcycle, optionally the vehicle being an off-road vehicle, the brake or clutch lever comprising the lever of the present disclosure, in any of its embodiments.

It is also an object of the present disclosure the use of the finger or hand lever of any of the present disclosure, in any of its embodiments, as a lever of a manual brake or a clutch control lever assembly of a vehicle, the vehicle being a bicycle, a tricycle, a motorcycle, a snowmobile or a snow motorcycle, optionally the vehicle being an off-road vehicle.

DETAILED DESCRIPTION

Figure 1:
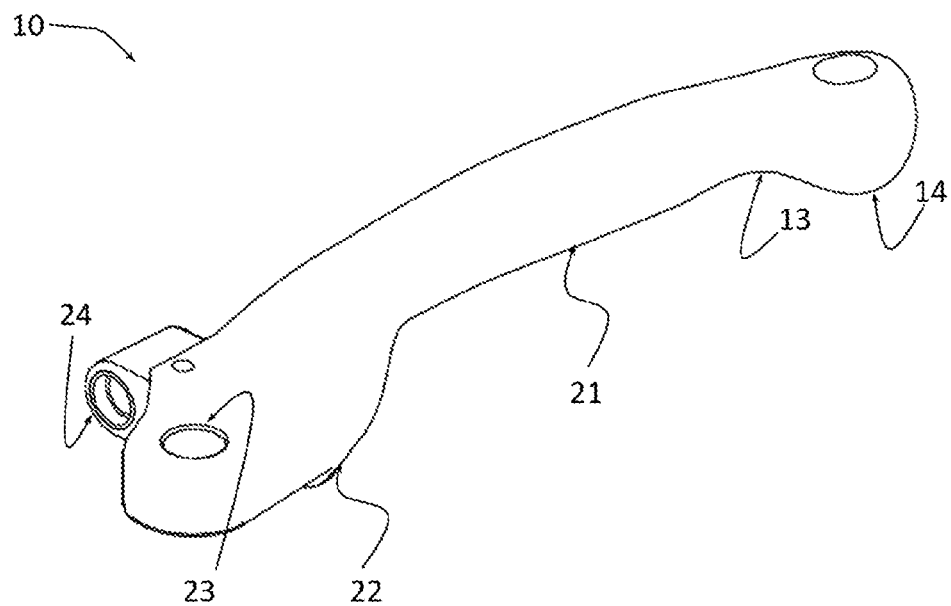
FIG. 1—representation of an embodiment of the lever (10) of the present invention. The several portions are represented, including the coupling portion (22), suitable for coupling to a manual brake or a clutch control lever (10) assembly of a vehicle, a working or finger portion, suitable for a user to pull the lever (10), a fuse portion (13), suitable to easily deform and a thickening portion (14). The insert (24) is also provided. An opening (23), in such case a rim (23) is formed in the coupling portion (22), for coupling.
Figure 2:
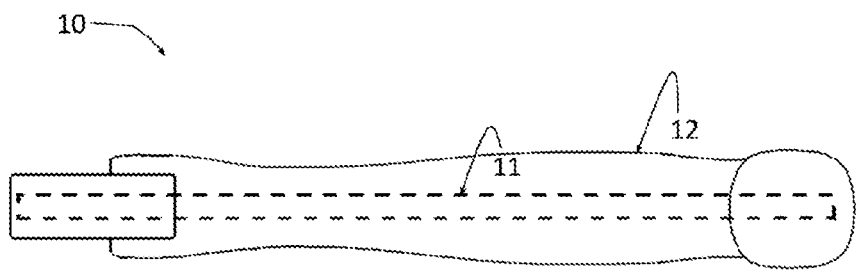
FIG. 2—representation of the same embodiment of FIG. 1, in a bottom view, highlighting the components of the lever (10), in particular the metallic core (11), which is covered by the polymeric cover (12).
Figure 3:
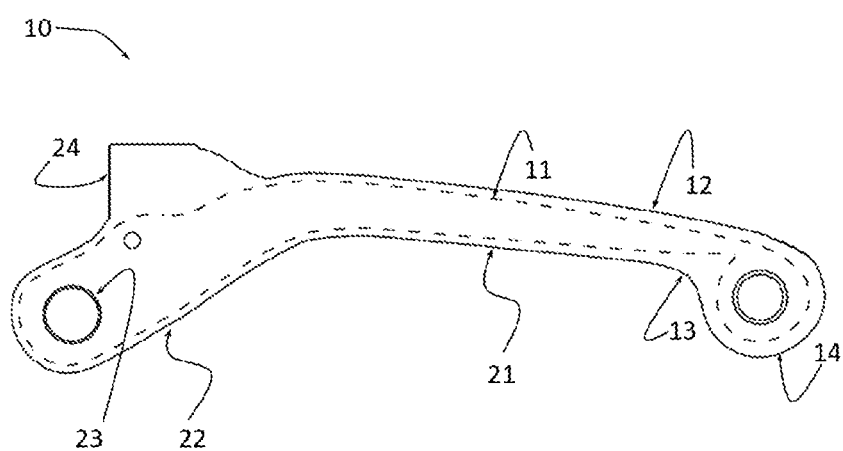
FIG. 3—representation of the same embodiment of FIGS. 1 and 2, in a side view, highlighting the components of the lever (10), in particular the metallic core (11), which is covered by the polymeric cover (12). It can be clearly seen that the thickening and the fuse portion (13) s are formed by an increase and a reduction of the polymeric cover (12). The same may be referred on the embedding of the insert (24) in the coupling portion (22), formed by a thickening of the polymeric cover (12).

The more general configurations of the present disclosure are described in the Summary of the disclosure. Such configurations are detailed below in accordance with other advantageous and/or preferred embodiments of implementation of the present disclosure.

As referred in the Summary of the Disclosure, the finger or hand lever (10) comprises a metallic core (11) and a polymeric cover (12). The metallic core (11) thereby extends along the lever (10). The extension may be longitudinal, along what may also be referred as the length of the lever (10). The extension may be substantially along the whole of the lever (10). Further embodiments with regard to the extension and arrangement of the metallic core (11) are further discussed in the present disclosure.

The polymeric cover (12) at least partially covers the metallic core (11). The polymeric cover (12) may thereby substantially cover the metallic core (11) or entirely cover the metallic core (11). The metallic core (11) may, thus, have one or more visible portions from the outside of the lever (10).

The lever (10) may be described by resort with at least two portions which form a single piece. A working portion (21) suitable for a user to provide more than one finger and a coupling portion (22) suitable for coupling to a corresponding section of a manual brake or clutch lever assembly of the vehicle. The coupling portion (22) may directly or indirectly couple to the corresponding section of a manual brake or clutch lever assembly of a vehicle.

As referred, the lever (10) of the present disclosure may be integrated in a manual brake or clutch lever assembly of a vehicle. The manual brake or clutch lever assembly of a vehicle thus has a corresponding coupling section, which provides for the coupling or fixed connection of the lever—through its coupling portion (22)—to the remaining elements of the manual brake or clutch control lever assembly of the vehicle.

The lever (10) may be suitable for a user to use it with one or more fingers, optionally more than one finger, optionally more than one of the fingers except the thumb, optionally all the fingers except the thumb. The length of the lever (10) may thereby be correspondingly varied, depending on the number of fingers it is intended to and on the age of the intended user (adult or child).

In one aspect, the metallic core (11) extends longitudinally along the lever (10), the longitudinal extension of the metallic core (11) being such that it extends over to the said coupling portion (22), the coupling portion (22) thereby including the metallic core (11). The metallic core (11) thereby extends longitudinally along the lever (10), providing robustness and unbreakability—within the expected range of forces, considering the referred applications—to such extension of the lever (10) (including the working portion (21)). Moreover, it extends over to the coupling portion (22), thereby allowing that such portion—which could be a fragile section—also benefits from the robust and unbreakable character of the whole lever (10).

In another aspect, the coupling portion (22) comprises at least one opening (23) suitable for coupling to a corresponding section of a manual brake or clutch control lever assembly of the vehicle. It thereby allows that another element, such as a set of a bolt and nut, allow to couple it to a corresponding coupling section of a manual brake or lever assembly. The opening (23) may be a rim (23). In an embodiment, the metallic core (11) extends over to the said coupling portion (22) and forming a corresponding opening (23), optionally a rim (23), thereby the coupling portion (22) benefitting from the robust and unbreakable character of the whole lever (10).

In another aspect, the metallic core (11) comprises, optionally consists of, steel, optionally stainless steel. Such material provides improved robustness and unbreakable character to the lever (10).

In an embodiment, the coupling portion (22) comprises an upper and a lower flange, each bifurcating from the working portion (21) and being suitable for coupling to a corresponding section of the manual brake or clutch lever assembly of the vehicle. It thereby provides a robust connection to a corresponding section of the manual brake or clutch lever assembly of the vehicle.

Advantageously, each coupling section comprises at least one opening (23) suitable for coupling to a corresponding section of a manual brake or clutch control lever assembly of the vehicle. The metallic core (11) may thereby extend over to each of the said coupling sections, the coupling sections benefitting from the robust and unbreakable character of the whole lever (10).

In a first embodiment, the coupling sections are joined to the working portion (21). In a second embodiment, at least one of the coupling sections is formed from a bending of the working portion (21) and the other coupling section is joined to the assembly. Both embodiments provide advantageous options of obtaining a bifurcated metallic core (11).

In an embodiment, the polymeric cover (12) comprises, optionally consists of, a thermoplastic polymer, optionally a rigid thermoplastic polymer. Such material allows for the lever (10) to be flexible but with a high hardness, thereby bending but not breaking.

Several embodiments with respect to the metallic core (11) are subsequently described.

In a first embodiment, the metallic core (11) is a metallic plate.

In a second embodiment, the metallic core (11) is a machined piece, optionally with the form of a finger or hand lever (10).

In a third embodiment, the metallic core (11) is a block, optionally a three-dimensional polyhedral block or a round body block.

In a fourth embodiment, the metallic core (11) has a maximum thickness of 4 mm, optionally the metallic core (11) has a thickness of 3 mm.

Several details of the first embodiment, in which the metallic core (11) is a metallic plate, are subsequently described.

In one aspect, the metallic plate has a constant thickness. It provides a simple manner of obtaining the lever (10), requiring a low quantity of metal while maintaining the robustness of the lever (10).

In another aspect, the metallic plate is embossed. The embossed metallic plate may have a constant or variable thickness. The embossing allows to provide further stiffness to the plate, being particularly advantageous when the plate has a constant thickness, by avoiding the usage of additional material through sections of higher thickness.

In an embodiment, the metallic plate has at least one section of greater thickness. It consists of a cumulative or alternative form of providing higher robustness to the plate.

In one aspect, the lever (10) comprises a fuse portion (13), the fuse portion (13) being provided substantially oppositely to the coupling portion (22) and being configured to deform easily upon action of a force of over a predefined threshold. In an embodiment, the fuse portion (13) is a portion of the lever (10) of reduced width.

In a further embodiment, an extension of the metallic core (11) is such that it extends over through the said fuse portion (13), the fuse portion (13) thereby including the metallic core (11). In an embodiment, the metallic core (11) has a reduced width in the fuse portion (13). Such embodiments allow to weaken such fuse section of the lever (10) by promoting its controlled warping. In an embodiment, the metallic core (11) extends through the fuse portion (13).

In an embodiment, a thickening portion (14) is provided, the thickening portion (14) being provided in an edge oppositely to the coupling portion (22) and being a portion of the lever (10) of higher width and thickness. Such thickening portion (14) allows a user to slide its hand through the lever (10) but to hold it in a thicker portion, the thickening portion (14), thereby improving the grasp of the lever (10).

Advantageously, the metallic core (11) does not vary its thickness and/or width in the thickening portion (14), the thickening being obtained by means of a thickening of the polymeric cover (12). In one embodiment, the polymeric cover (12) is applied over the metallic core (11) through an injection process. More particularly, the metallic core (11) is inserted in a mould, and during the injection stage, polymeric material is deposited on the metallic core (11), creating an envelopment in the entire metallic core (11).

In an embodiment, the thickening portion (14) comprises a through-hole provided transversally, thus substantially perpendicularly to the longitudinal extension of the lever (10).

Advantageously, the polymeric cover (12) is such that it has a predefined colour, glow and/or texture, the texture comprising one or more protrusions and/or projections which may consist of overmoulding injections. Such embodiment provides a high degree of customization of colour, feel, glow or texture of the lever (10), through the corresponding adaptation of the polymeric cover (12).

In an embodiment, the width of the metallic core (11)—and thereby of the lever (10)—is higher in the coupling portion (22). Such further embodiment allows to make such portion of the lever (10) more robust since, by being suitable for coupling to a corresponding section of a lever (10) and thereby by having corresponding means, it could be more fragile and thereby more prone to breaking.

In another aspect, the lever (10) further comprises an insert (24) for adjusting a distance from the lever (10) to a handlebar of a vehicle, the insert (24) being advantageously provided in the coupling portion (22). Optionally, the insert (24) is a metallic insert (24).

Advantageously, the polymeric cover (12) is formed such that the insert (24) is at least partially embedded in the polymeric cover (12), the insert (24) thereby being fixed in the lever (10) through such embedding. It thus consists of a simplified manner of embedding and thereby fixedly coupling the insert (24) to the other elements of the lever (10). The insert (24) may consist of a substantially cylindrical metallic insert (24).

Of course, the preferred embodiments shown above are combinable, in the different possible forms, being herein avoided the repetition all such combinations.

The invention claimed is:

1. A finger or hand lever (10) for a manual brake or clutch control lever assembly of a vehicle, the vehicle being a bicycle, a tricycle, a motorcycle, a snowmobile or a snow motorcycle, wherein the finger or hand lever comprises a metallic core (11) and a polymeric cover (12), the metallic core (11) being an embossed metallic plate and extending along the lever (10) and the polymeric cover (12) at least partially covering the metallic core (11), the lever (10) comprising a working portion (21) suitable for a user to provide more than one finger and a coupling portion (22) suitable for coupling to a corresponding section of a manual brake or clutch control lever assembly of the vehicle, wherein the polymeric cover (12) substantially covers the metallic core (11) or entirely covers the metallic core (11), and wherein the polymeric cover (12) is formed such that an insert (24) is embedded in the polymeric cover (12), the insert (24) thereby being fixed in the lever (10) through such embedding.

2. A finger or hand lever (10) according to claim 1 wherein the metallic core (11) extends longitudinally along the lever (10), the longitudinal extension of the metallic core (11) being such that it extends over to the coupling portion (22), the coupling portion (22) thereby including the metallic core (11).

3. A finger or hand lever (10) according to claim 2 wherein the coupling portion (22) comprises two separate coupling sections, each bifurcating from the working portion (21) and being suitable for coupling to a corresponding section of the manual brake or clutch control lever assembly of the vehicle, optionally each coupling section comprising at least one opening (23) suitable for coupling to a corresponding section of the manual brake or clutch control lever assembly of the vehicle.

4. A finger or hand lever (10) according claim 3 wherein the coupling sections are joined to the working portion (21) or at least one of the coupling sections is formed from a bending of the working portion (21) and the other coupling section is joined to the assembly.

5. A finger or hand lever (10) according to claim 1 wherein the coupling portion (22) comprises at least one opening (23), a rim (23), suitable for coupling to a corresponding section of a manual brake or clutch control lever assembly of the vehicle, the metallic core (11) extending over to the coupling portion (22) and forming a corresponding opening (23), optionally a rim (23).

6. A finger or hand lever (10) according to claim 1 wherein the metallic core (11) comprises steel.

7. A finger or hand lever (10) according to claim 1 wherein the polymeric cover (12) comprises a rigid thermoplastic polymer.

8. A finger or hand lever (10) according to claim 1 wherein it comprises a fuse portion (13), the fuse portion (13) being provided substantially oppositely to the coupling portion (22) and being configured to easily deform upon action of a force of over a predefined threshold, optionally the fuse portion (13) being a portion of the lever (10) of reduced width.

9. A finger or hand lever (10) according to claim 8 wherein an extension of the metallic core (11) is such that it extends over through the fuse portion (13), the fuse portion (13) thereby including the metallic core (11).

10. A finger or hand lever (10) according to claim 1 wherein the finger or hand lever comprises a thickening portion (14), the thickening portion (14) being provided in an edge oppositely to the coupling portion (22) and being a portion of the finger or hand lever (10) of higher width and thickness.

11. A finger or hand lever (10) according to claim 1 wherein the metallic core (11) does not vary its thickness and/or width in the thickening portion (14).

12. A finger or hand lever (10) according to claim 11 wherein the polymeric cover (12) is such that it has a predefined colour, glow and/or texture, the texture comprising one or more protrusions and/or projections.

13. A finger or hand lever (10) according to claim 1 wherein the width of the metallic core (11) is higher in the coupling portion (22).

14. A finger or hand lever (10) according to claim 1 wherein the finger or hand lever further comprises an insert (24) for adjusting a distance from a handle of a vehicle, the insert (24) being provided in the coupling portion (22).

15. A manual brake or clutch control lever assembly of a vehicle, the vehicle being a bicycle, a tricycle, a motorcycle, a snowmobile, a snow motorcycle, or an off-road vehicle, the manual brake or clutch control lever assembly comprising a finger or hand lever (10) for a manual brake or clutch control lever assembly of a vehicle, the vehicle being a bicycle, a tricycle, a motorcycle, a snowmobile or a snow motorcycle, the lever comprising
- a metallic core (11) and a polymeric cover (12), the metallic core (11) extending along the lever (10) and the polymeric cover (12) at least partially covering the metallic core (11), the lever (10) comprising a working portion (21) suitable for a user to provide more than one finger and a coupling portion (22) suitable for coupling to a corresponding section of a manual brake or clutch control lever assembly of the vehicle,
- wherein the polymeric cover (12) substantially covers the metallic core (11) or entirely covers the metallic core (11), and
- wherein the polymeric cover (12) is formed such that an insert (24) is embedded in the polymeric cover (12), the insert (24) thereby being fixed in the lever (10) through such embedding.

16. Use of a finger or hand lever (10) for a manual brake or clutch control lever assembly of a vehicle, the vehicle being a bicycle, a tricycle, a motorcycle, a snowmobile or a snow motorcycle as a lever (10) of manual brake or clutch control lever assembly of a vehicle, the vehicle being a bicycle, a tricycle, a motorcycle, a snowmobile, a snow motorcycle, or an off-road vehicle, the lever comprising
- a metallic core (11) and a polymeric cover (12), the metallic core (11) extending along the lever (10) and the polymeric cover (12) at least partially covering the metallic core (11), the lever (10) comprising a working portion (21) suitable for a user to provide more than one finger and a coupling portion (22) suitable for coupling to a corresponding section of a manual brake or clutch control lever assembly of the vehicle,
- wherein the polymeric cover (12) substantially covers the metallic core (11) or entirely covers the metallic core (11), and
- wherein the polymeric cover (12) is formed such that an insert (24) is embedded in the polymeric cover (12), the insert (24) thereby being fixed in the lever (10) through such embedding.

* * * * *